US012565796B2

(12) United States Patent
Porada

(10) Patent No.: US 12,565,796 B2
(45) Date of Patent: Mar. 3, 2026

(54) HANDLE UNIT FOR A VEHICLE, OPENING PART HAVING AN ELECTRICAL AND A MECHANICAL OPENING MECHANISM, AND METHOD FOR OPERATING A HANDLE UNIT

(71) Applicant: Huf Hülsbeck & Fürst GmbH & Co. KG, Velbert (DE)

(72) Inventor: Martin Porada, Wuppertal (DE)

(73) Assignee: Huf Hulsbeck & Furst GMBH & Co. KG, Velbert (DE)

( * ) Notice: Subject to any disclaimer, the term of this patent is extended or adjusted under 35 U.S.C. 154(b) by 142 days.

(21) Appl. No.: 18/700,935

(22) PCT Filed: May 20, 2022

(86) PCT No.: PCT/EP2022/063756
§ 371 (c)(1),
(2) Date: Apr. 12, 2024

(87) PCT Pub. No.: WO2023/061629
PCT Pub. Date: Apr. 20, 2023

(65) Prior Publication Data

US 2024/0410206 A1 Dec. 12, 2024

(30) Foreign Application Priority Data

Oct. 15, 2021 (DE) ..................... 10 2021 126 799.4

(51) Int. Cl.
*E05B 81/90* (2014.01)
*E05B 85/10* (2014.01)

(52) U.S. Cl.
CPC ............. *E05B 81/90* (2013.01); *E05B 85/10* (2013.01)

(58) Field of Classification Search
CPC .......... E05B 81/90; E05B 85/10; E05B 85/14; E05B 85/16; E05B 77/02
See application file for complete search history.

(56) References Cited

U.S. PATENT DOCUMENTS

2018/0195319 A1* 7/2018 Cousin .................... E05B 81/58
2021/0062558 A1 3/2021 Beck

FOREIGN PATENT DOCUMENTS

DE 102017123258 A1 4/2019
DE 102008024341 B4 12/2020

OTHER PUBLICATIONS

International Search Report for corresponding PCT Application No. PCT/EP2022/063756 mailed Sep. 9, 2022.

* cited by examiner

*Primary Examiner* — Christine M Mills
*Assistant Examiner* — Christopher F Callahan
(74) *Attorney, Agent, or Firm* — Honigman LLP; Matthew H. Szalach

(57) ABSTRACT

The invention relates to a handle unit for a vehicle, having a handle for opening an opening part of the vehicle, which is movable at least between an actuation position for activating an electrical opening function for opening the opening part and an emergency opening position for mechanically opening the opening part, a rotation element which is designed for rotation about a preferably axis of rotation or pivot path when the handle is moved from the actuation position into the emergency opening position, and a counterforce element for exerting a counterforce on the rotation element when the handle is moved from the actuation position into the emergency opening position. The invention also relates to an opening part and to a method for operating a handle unit.

15 Claims, 6 Drawing Sheets

Figure 1:
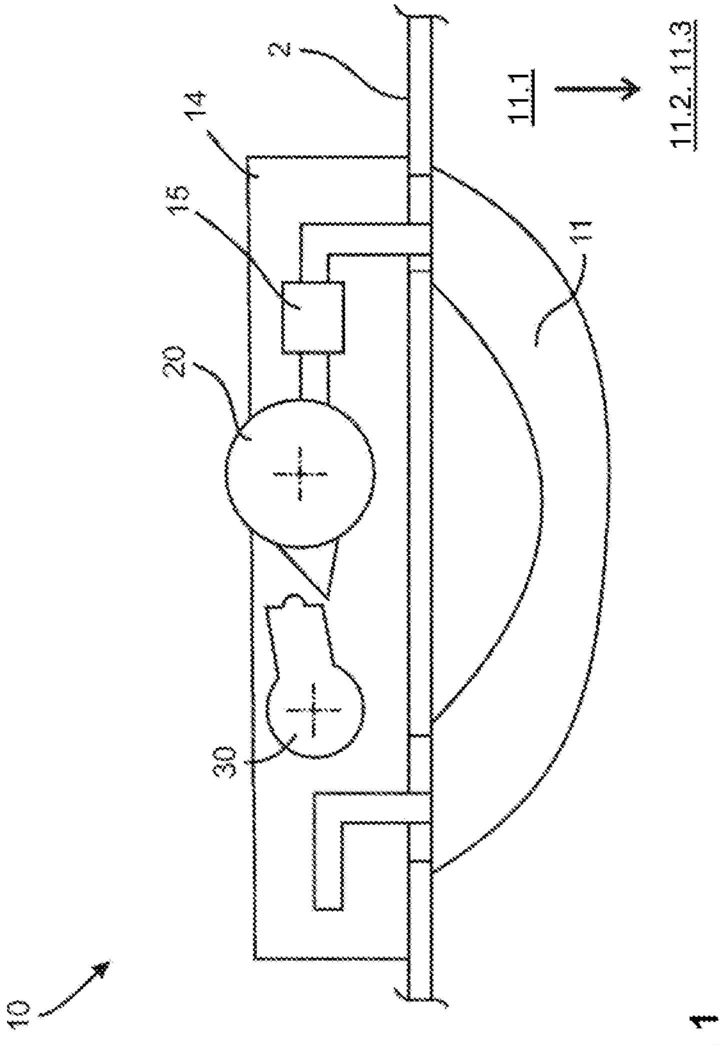

HANDLE UNIT FOR A VEHICLE, OPENING PART HAVING AN ELECTRICAL AND A MECHANICAL OPENING MECHANISM, AND METHOD FOR OPERATING A HANDLE UNIT

CROSS-REFERENCE TO RELATED APPLICATIONS

This application claims priority under 35 U.S.C. § 371 to Patent Cooperation Treaty Application No. PCT/EP2022/063756, filed May 20, 2022, which claims the benefit of earlier filed German Application No. DE 102021126799.4 filed on Oct. 15, 2021. The entire contents of these applications are incorporated herein by reference in their entirety.

The invention relates to a handle unit for a vehicle, an opening part with an electrical and a mechanical opening mechanism, and a method for operating a handle unit for opening an opening part of a vehicle in the event of a defect in an electrical opening function.

Electrical opening mechanisms for vehicle doors are known from the prior art. A vehicle door is unlocked and/or opened automatically by the electrical opening mechanism.

In order to still enable access to the vehicle in the event of a defect in an electrical opening mechanism, for example due to an accident of the vehicle, mechanical opening mechanisms are often additionally provided, which can be operated manually in the event of a defect in the electrical opening mechanism. For example, a mechanical opening mechanism can be operated by rescue workers. From DE 10 2017 123 258 A1, for example, a door handle is known in which, in order to activate a mechanical opening mechanism, a counterforce must be overcome by pressing down a spring, Finally, to move the door handle back to the initial position, the spring must be pressed down again.

In addition to the use of the mechanical opening mechanism in the event of an accident, it can often also be activated in the event of another defect, such as a temporary defect in the control of the electrical opening mechanism. If a high level of force is required by the user to reset the handle or an increased spring force of a return spring is required, this can lead to irritation and/or a loss of comfort for the user. In the worst case, the handle can also remain in its operating position, particularly due to the high restoring force required, so that the vehicle door may not be able to be closed.

It is a task of the present invention to fix at least partially the preceding disadvantages known from the state of the art. In particular, it is a task of the present invention to improve an emergency opening option for an opening part of a vehicle, preferably by simplifying the resetting of the handle, and to increase safety.

The preceding task is achieved by a handle unit with the features of claim 1, an opening part with the features of claim 14, and a method with the features of claim 15. Further features and details of the invention result from the respective subclaims, the specification and the drawings. Features and details which are described in connection with the handle unit according to the invention naturally also apply in connection with the opening part according to the invention and/or the method according to the invention and vice versa in each case, so that reference is or can always be made to the individual aspects of the invention reciprocally with regard to the disclosure.

According to a first aspect of the invention, a handle unit is provided for a vehicle. The handle unit has a handle for opening an opening part of the vehicle, which is movable at least between an actuation position for activating an electrical opening function for opening the opening part and an emergency opening position for mechanically opening the opening part. Furthermore, the handle unit comprises a rotation element which is designed for rotation (also referred to as pivoting) about a preferably rotation axis or pivoting track when moving the handle from the operating position to the emergency opening position. Consequently, the rotation element can also perform a pivoting movement along a pivoting arc. Furthermore, the handle unit has a counterforce element for exerting a counterforce on the rotation element when moving the handle from the operating position to the emergency opening position. The rotation element and the counterforce element form a contact pair that has at least one contact area that can be brought into a resistance position in which the counterforce can be exerted by the counterforce element on the rotation element. Furthermore, the contact area can be brought into a release position in which the counterforce element can be overcome when moving the handle from the actuation position to the emergency opening position.

Furthermore, it can be provided that the counterforce element has a movable bearing for a movement of the counterforce element in at least one restoring direction, whereby the counterforce element can be overcome by the rotation element when the handle is moved back from the emergency opening position, in particular into the actuation position and/or a rest position, especially while the contact area is in the resistance position.

To mechanically open the opening part, the handle can be connected to a Bowden cable, through which a mechanical opening mechanism can be actuated. For example, the handle and/or the rotation element can have a fastening interface for connection to a Bowden cable. To activate the opening function, the handle, in particular in the actuation position, can be or be brought in an operative connection to an electrical actuating element, for example in the form of a microswitch or a proximity sensor. In the actuation position, the actuation element can be actuated or actuable. It can be provided that an electrical switch of the actuating element is closed when the handle is in the actuation position. However, it is also conceivable that a proximity sensor can be activated when the handle is in the operating position and the user approaches. The handle can be a pull handle and/or a folding handle.

The axis of rotation is in particular a geometric axis. The pivoting track can be realized by an arcuate guide in order to generate a pivoting movement of the rotating element. The rotation element can include, for example, a mass balance weight. Preferably, the rotation element is connected to the handle, in particular integrally. However, it is also conceivable that the rotation element is operatively connected to the handle via a gear, for example in the form of a lever mechanism, in order to rotate about the axis of rotation when the handle is moved from the operating position to the emergency opening position. The rotation element can be mounted on a handle support of the handle unit. For example, the handle unit can be attached to the opening part by the handle support.

The counterforce can in particular counteract an actuating force, which preferably acts as a function of the actuation of the handle on the rotating element. The counterforce when moving the handle from the actuation position to the emergency opening position can be exerted on the rotation element by the counterforce element at least in a movement section of the rotation element and/or the handle. The contact area is designed in particular for force transmission between the counterforce element and the rotation element. The contact pair can be designed in particular to produce a non-positive and/or positive connection in at least one movement section when moving the handle from the actuation position to the emergency opening position. The contact pair includes the contact area and preferably a counter-contact area. For example, the contact area can be formed on the counterforce element and the counterforce area on the rotation element or vice versa. However, it is also conceivable that both the counterforce element and the rotation element each have a contact area that is adjustable between a resistance position and a release position.

The counterforce element can advantageously be designed like a lever. Due to the storage, the counterforce element can be mounted, for example, on the handle support, in particular in order to apply the counterforce. The bearing of the counterforce element can be designed for translational and/or rotational bearing of the counterforce element. For example, the storage can include a plain bearing and/or a rolling element bearing. The contact area can move and/or change an external shape between the resistance layer and the release layer. It can be provided that the contact area is biased into the resistance position, so that when the handle is moved from the actuation position to the emergency opening position, the contact area is brought into the release position and automatically returns to the resistance position when the counterforce element and the rotation element are separated from one another, that is, in particular, the non-positive and/or positive connection of the contact pair is eliminated.

Due to the movable bearing, the counterforce element can avoid the rotation element when the handle is moved back. As a result, when the handle is moved back from the emergency opening position, the counterforce element exerts in particular only a reduced counterforce on the rotation element. As a result, for example, a restoring unit of the handle can be smaller in size, which in particular also improves the feel when moving the handle from the actuation position to the emergency opening position, since the actuating force counteracts a lower restoring force. If the handle is moved back manually, the manual restoring force may be reduced. When moving the handle into the emergency opening position, the counterforce element can be loaded along an actuation direction, wherein the restoring direction is oriented in particular opposite to the actuation direction.

An emergency opening option for the opening part is thus improved by a simplified resetting of the handle. Loss of comfort in the event of a defect in the electrical opening mechanism is reduced by smoothing out the force curve when moving the handle back from the emergency opening position. This also ensures that the handle does not remain in its emergency opening position, thereby improving safety.

Furthermore, in a handle unit according to the invention, it is conceivable that a pivot bearing of the rotation element and the bearing of the counterforce element have a bearing distance from one another, through which the counterforce element and the rotation element contact each other in a first movement section when the handle is moved back from the emergency opening position and are released from each other in a second movement section. The pivot bearing is designed in particular to rotatably support the rotation element about the axis of rotation. The bearing distance enables the first and second movement sections. For example, when moving the handle between the emergency opening position and the actuation position and/or vice versa, the rotation element and the counterforce element can each carry out at least partial circular movements that overlap in the first movement section. In the second movement section, the circular movements can run separately from each other. In particular, the one force-fitting and/or positive connection of the rotation element and the counterforce element is eliminated in the second movement section. The bearing distance can be constant, for example if the pivot bearing and the movable bearing are firmly fixed to the handle support. However, it is also conceivable that the bearing distance changes when the handle is moved. For example, the movable bearing can be guided in a link guide, whereby the bearing distance can change when the handle is moved and/or moved back.

The first movement section is defined in particular by the bearing distance and a length of the rotation element and a length of the counterforce element. The moving back of the handle for the sequence of movements can therefore be set or adjustable in a clever manner.

Within the scope of the invention, it is further conceivable that the contact area is designed to be deformable, so that the counterforce element can be overcome by the rotation element when moving the handle from the actuation position to the emergency opening position by deforming the contact area. The contact area can, for example, be pressed down to overcome the counterforce. Furthermore, it is conceivable that the contact area is at least partially compressed to reach the release position. The deformation can create a freedom of movement for a counter-contact area of the contact pair, so that the counter-contact area can pass through the contact area.

It is also conceivable in a handle unit according to the invention that the contact area is designed to be elastic for the, in particular automatic, return movement of the contact area from the release position into the resistance position. Preferably, the contact area is elastically deformable in order to be moved from the resistance position into the release position. The contact area can thus restore its original shape during the return movement from the release position to the resistance position. The automatic return movement can take place in particular after the counterforce and/or the counterforce element has been overcome by the rotation element. It can be provided that the contact area has a deformable shape. For example, the contact area can comprise a metal, preferably in the form of a metal sheet. However, it is also conceivable for the contact area to comprise a plastic, in particular a soft component and/or a foam. Because the contact area itself is designed to be elastic, an additional return spring for the return movement can be omitted, for example. Additionally or alternatively, the contact area can be movable and prestressed or prestressed into the resistance layer by an elastic element.

Furthermore, in a handle unit according to the invention it can advantageously be provided that the contact area comprises a spring, in particular in the form of a leaf spring. Preferably, the contact area can be formed by the spring. For example, the counterforce element can have a rigid counterforce body on which the spring and the movable bearing are arranged. The spring is particularly a cost-effective component. Furthermore, a force curve of the counterforce when moving the handle can be defined or definable by the spring. By adjusting the spring force of the spring, the counterforce can be adjusted for a comfortable feel.

Furthermore, in a handle unit according to the invention, it is conceivable that the contact area has a first end, at which the contact area is attached to the rotation element and/or to the counterforce element, and a second end, which is used to overcome the contact area when moving the handle from the actuation position to the emergency opening position is unpaved. Because the contact area is only fixed at the first end, a floating and/or sliding bearing of the second end can be realized. The second end can thus be movable while the first end is fixed. It can be provided that the second end rests loosely on a rotation body of the rotation element or on a counterforce body of the counterforce element and is guided by the rotation body or the counterforce body when the contact area is brought from the resistance position to the release position and/or vice versa. As a result, the contact area at the second end can have freedom of movement, which promotes elastic deformation of the contact area. The contact area can thus at least partially move into the release position, whereby an adjustment path of the contact area can be extended without any, in particular significant, plastic deformation of the contact area occurring.

It is also conceivable in a handle unit according to the invention that the contact pair has a, in particular rigid, counter-contact area for contacting the contact area in the resistance position, preferably wherein the counter-contact area comprises a control contour for changing a force curve of the counterforce when moving the handle from the actuation position to the emergency opening position. The control contour can, for example, determine a contact point when moving the handle from the operating position to the emergency opening position. Furthermore, the force curve can be adjustable through the control cam for the user's haptics when moving the handle from the operating position to the emergency opening position. For example, the control curve can include a steep slope in order to apply the counterforce.

Furthermore, in a handle unit according to the invention, it can advantageously be provided that the counter-contact area and/or the contact area has a control cam for an increase in the counterforce when moving the handle from the actuation position to the emergency opening position. For example, the control contour can include a circular arc-shaped section from which the control cam protrudes. The contact area can be pressed down by the control cam in order to move the contact area from the resistance position to the release position. After the control cam has passed the contact area, the contact area can return to the resistance position, in particular spring back.

Preferably, in a handle unit according to the invention, it can be provided that the movable bearing of the counterforce element is designed to rotatably mount the counterforce element about a bearing axis parallel to the axis of rotation. The bearing axis is preferably a geometric axis. The contact area and the counter-contact area can thus move at least in sections on circular paths. The contact pair preferably has an overlapping movement section in which the counterforce is generated. In the areas where the circular paths do not overlap, the contact of the contact pair can be eliminated. This allows advantageous kinematics for a temporary counterforce to be realized when moving the handle from the operating position to the rest position.

Furthermore, in a handle unit according to the invention, it can advantageously be provided that a blocking element is provided, which is designed to block the counterforce element, i.e., in particular a movement of the counterforce element, in an actuation direction opposite to the restoring direction, in particular wherein the counterforce element is designed to rest on the blocking element when moving the handle from the operating position to the emergency opening position. The direction of actuation can in particular also be referred to as the direction of loading. The restoring direction can be oriented in such a way that the counterforce element moves away from the blocking element when moving along the restoring direction. The blocking element can, for example, be attached to the handle support of the handle unit and/or be integrated into the handle support of the handle unit. It can be provided that the counterforce element is a resistance in the form of a mechanical stop. The blocking element limits movement of the counterforce element in the restoring direction, whereby the counterforce can be applied as a support force. This leads, for example, to the contact area being deformed when the handle is moved further against the counterforce. Because the blocking element only acts in the restoring direction, the counterforce element can avoid the rotation element when the handle is returned from the emergency opening position to the actuation position.

Preferably, in a handle unit according to the invention, it can be provided that a biasing unit is provided for biasing the counterforce element in the actuation direction. The biasing unit can comprise a spring, preferably in the form of a torsion spring, for biasing the counterforce element about the bearing axis. The counterforce element is thus pressed in particular onto the blocking element. When returning the handle from the emergency opening position to the actuation position, the biasing unit thus preferably counteracts the movement of the handle. It can be provided that the biasing unit has a low spring force if the counterforce element is not exposed to any further external forces, particularly in the second movement section. The biasing unit allows the counterforce element to return to the blocking element after the counterforce element has avoided the rotation element. This allows the emergency opening process to be repeated, in particular without the handle unit having to be serviced.

Within the scope of the invention, it is further conceivable that the handle can be brought into an unactuated rest position, wherein the handle is able to be brought from the rest position via the actuation position into the emergency opening position. For example, the actuating element can be actuated by moving the handle from the rest position to the actuation position. It can be provided that the movement of the handle from the rest position to the actuation position takes place along a short stroke distance, in particular of approximately or exactly 4° around a handle axis. The handle axis can advantageously be the axis of rotation of the rotation element or another axis parallel to the axis of rotation. It can be provided that the handle in the rest position is flush, in particular straight flush, with an outer surface of the opening part. This can improve the appearance and/or aerodynamics of the opening part with the handle. By moving from the rest position to the actuation position, an actuation action by the user can be made possible in order to actuate the electrical opening mechanism in normal operation. The counterforce provides the user with haptic feedback, particularly via the actuation of the electrical opening mechanism. If the electric opening mechanism does not respond due to a malfunction, the user can apply the counterforce to operate the mechanical opening mechanism.

Within the scope of the invention, it is further conceivable that a restoring unit is provided for biasing the handle into the rest position and/or the actuation position. The restoring unit can comprise a spring, in particular in the form of a torsion spring, A greater spring force and/or a greater restoring moment can preferably be applied by the restoring unit than by the biasing unit. This allows the handle to be brought into the rest position and/or the operating position in a simple manner. As a result, the original functional state of the handle unit is restored even after an emergency opening, which, for example, allows the vehicle to continue to operate. Furthermore, improved comfort can be achieved, particularly with a folding handle, which a user would otherwise have to laboriously free from the emergency opening position.

According to a further aspect of the invention, an opening part is provided. The opening part has an electrical opening mechanism for an electrical opening function of the opening part and a mechanical opening mechanism for mechanically opening the opening part. Furthermore, the opening part comprises a handle unit according to the invention.

An opening part according to the invention thus brings with it the same advantages as have already been described in detail with reference to a handle unit according to the invention. The opening part can be, for example, a door and/or a flap of the vehicle. The vehicle can be, for example, a motor vehicle and/or an aircraft. The mechanical opening mechanism can, for example, include a mechanical transmission element, such as a Bowden cable, for actuating a locking unit for locking and/or unlocking the opening part.

The electrical opening mechanism can have an electrical actuating element, for example in the form of a microswitch, a proximity sensor and/or a touch sensor. Furthermore, the electrical opening mechanism can include a servomotor for actuating the locking unit to lock and/or unlock the opening part. Furthermore, it is conceivable that the electrical opening mechanism has an actuator for an automatic opening and/or closing movement of the opening part. Furthermore, the opening part can have a control unit for an authentication process for authenticating a user, for example using an ID transmitter.

According to a further aspect of the invention, a method for operating a handle unit, in particular a handle unit according to the invention, for opening an opening part of a vehicle in the event of a defect in an electrical opening function is provided. The method comprises the following steps:

Moving a handle of the handle unit from an actuation position for activating the electrical opening function into an emergency opening position for mechanically opening the opening part, wherein when moving the handle from the actuation position to the emergency opening position, a counterforce is overcome by bringing a contact area from a resistance position, in which a counterforce can be exerted by a counterforce element of the handle unit on a rotational element of the handle unit, into a release position, Moving the handle back from the emergency opening position, in particular into the actuation position and/or a rest position, wherein the counterforce element is moved in at least one restoring direction, so that the rotation element overcomes the counterforce element, in particular while the contact area is in the resistance position.

A method according to the invention thus brings with it the same advantages as have already been described in detail with reference to a handle unit according to the invention and/or an opening part according to the invention. It can be provided that the counterforce is applied directly in the actuation position and/or in a subsequent movement section between the actuation position and the emergency opening position. Moving the handle back can preferably be done automatically. It can also be provided that before moving the handle from the operating position to the emergency opening position, the handle is moved from a rest position to the operating position, in particular by pivoting the handle by approximately or exactly 4°.

Figure 2:
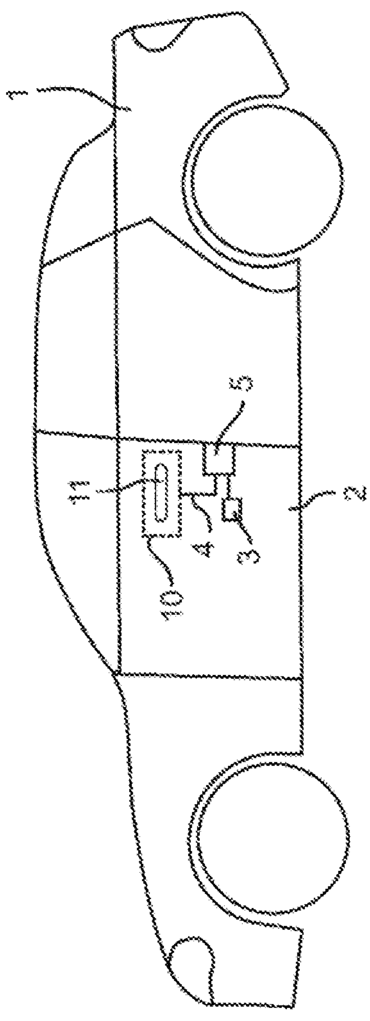
Figure 3B:
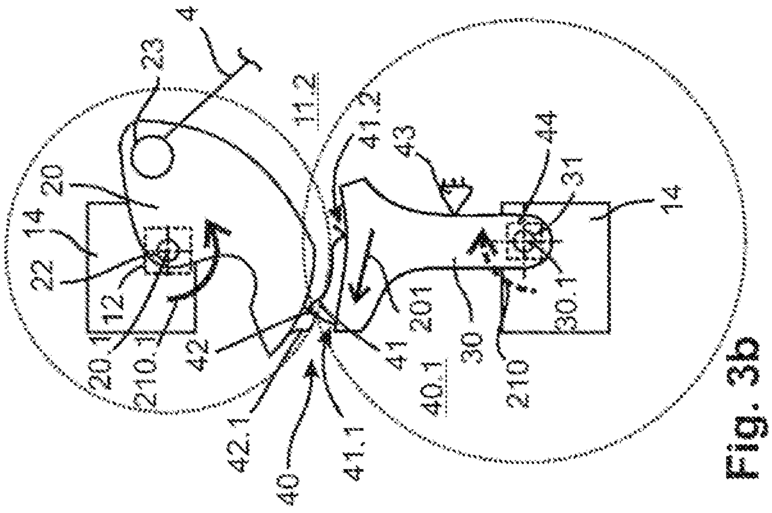
Figure 3A:
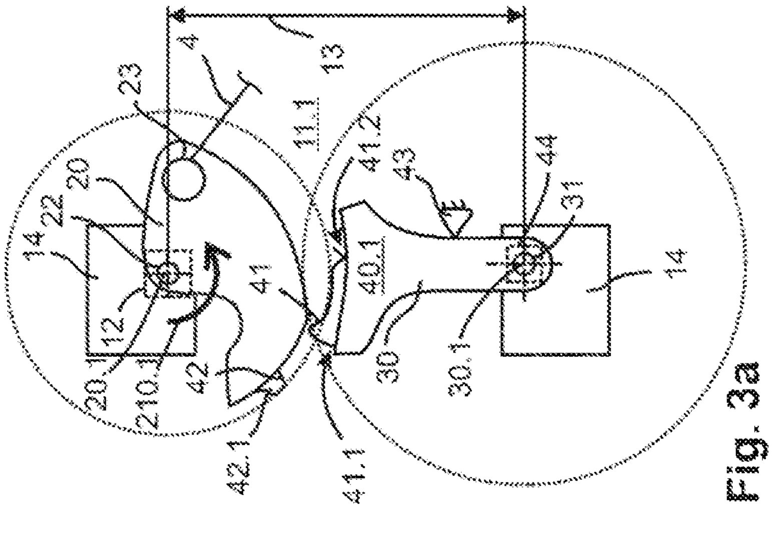
Figure 3D:
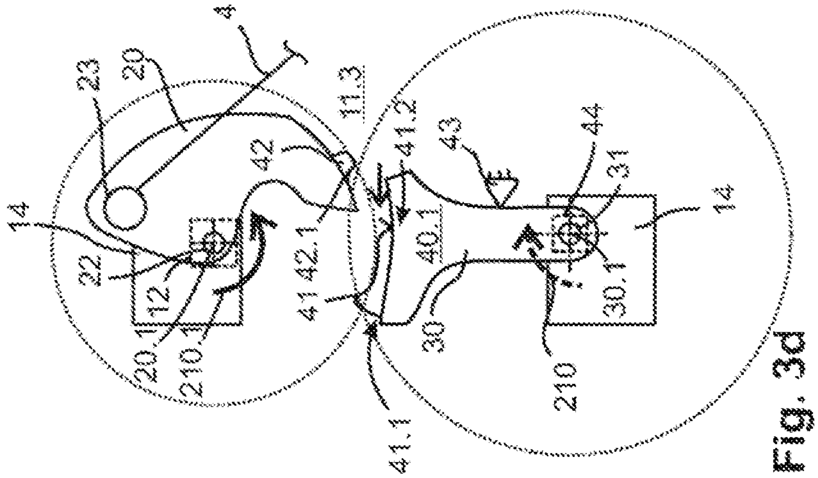
Figure 3C:
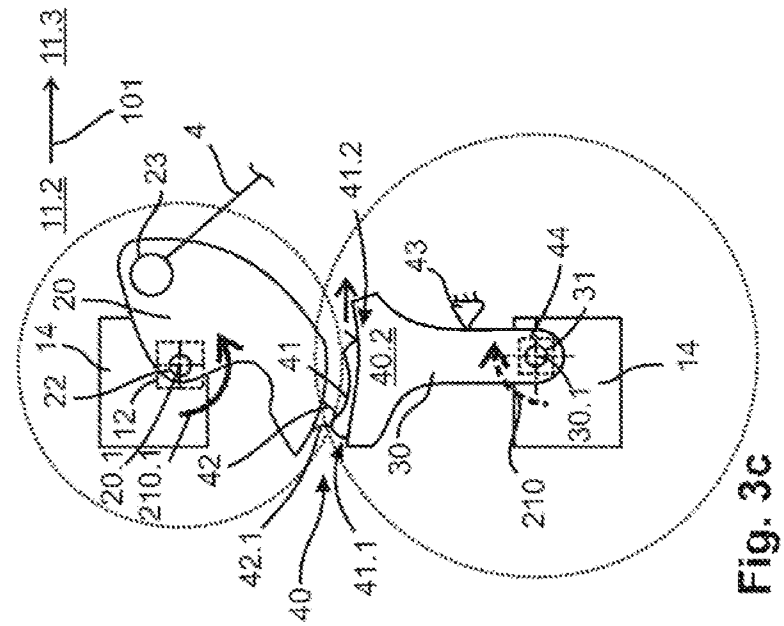
Figure 3E:
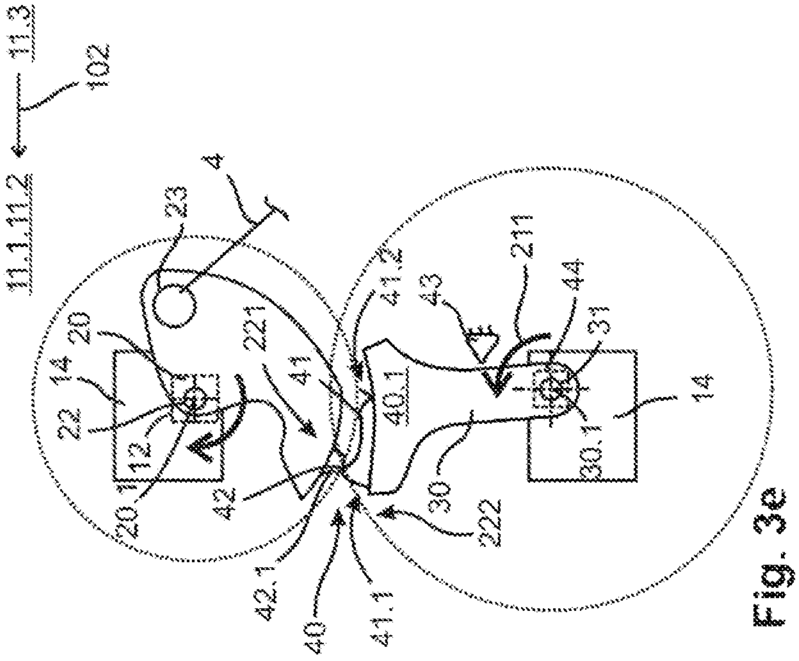
Figure 4:
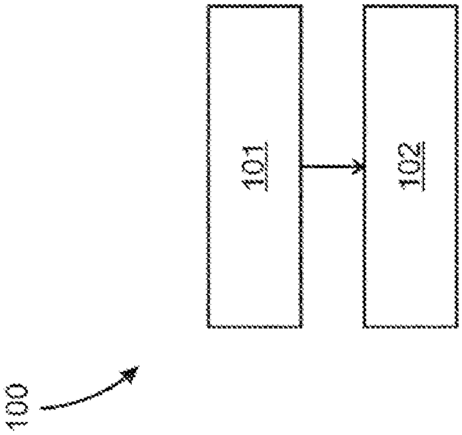
Figure 5:
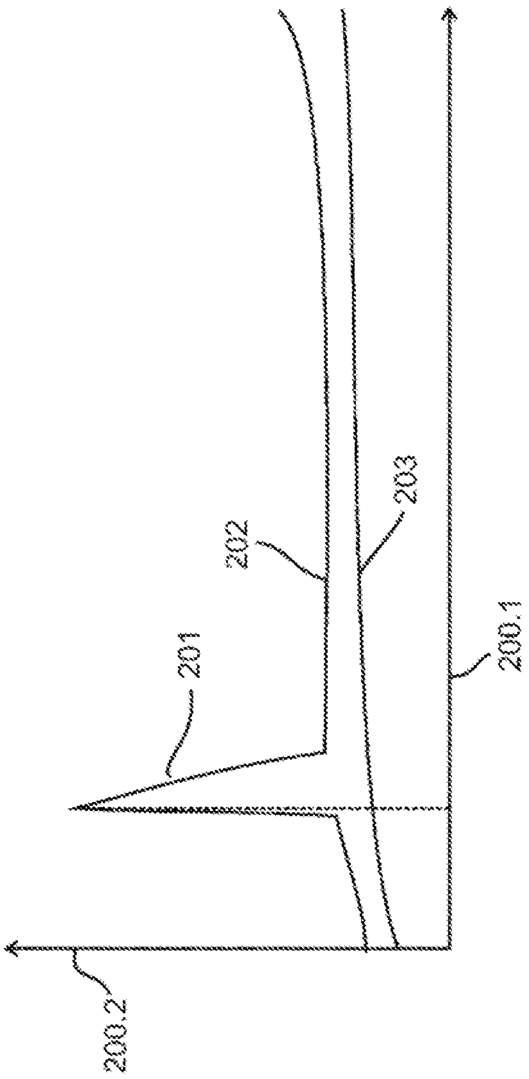

Further advantages, features and details of the invention are shown in the following description, in which embodiments of the invention are described in detail with reference to the drawings. The features mentioned in the claims and in the description can each be essential to the invention individually or in any combination. The invention is shown schematically in:

FIG. 1 a structure of a handle unit according to the invention on an opening part according to the invention, FIG. 2 vehicle with the opening part, FIGS. 3*a-e* a movement sequence of a rotation element and a counterforce element of the handle unit when moving a handle from a rest position to an emergency opening position and vice versa, FIG. 4 a method according to the invention for operating the handle unit in a schematic representation of method steps, and FIG. 5 a force curve during the movement sequence.

In the following description of some exemplary embodiments of the invention, the identical reference numerals are used for the same technical features in different exemplary embodiments.

FIG. 1 shows a handle unit 10 according to the invention for a vehicle 1 in a first exemplary embodiment. The handle unit 10 is arranged on an opening part 2 according to the invention. As shown in FIG. 2, the opening part 2 is, for example, a vehicle door of the vehicle 1. The opening part 2 comprises an electrical opening mechanism 3 for an electrical opening function and a mechanical opening mechanism 4 for mechanically opening the opening part 2. The electrical opening mechanism 3 and the mechanical opening mechanism 4 is also operatively connected to a locking unit 5 for locking and/or unlocking the opening part 2. For this purpose, the mechanical opening mechanism 4 in particular has a mechanical transmission element, such as a Bowden cable, for actuating the locking unit 5. The electrical opening mechanism 3 can have an electrical actuating element, for example in the form of a microswitch, a proximity sensor and/or a touch sensor, whereby an electrical actuator can be controlled for actuating the locking unit 5.

The handle unit 10 further comprises a handle 11 for opening the opening part 2 of the vehicle 1. As shown in FIG. 1, the handle 11 can be a pull handle. However, it is also conceivable that the handle 11 is a folding handle. In FIG. 1, the handle 11 is in an unactuated rest position 11.1, in which the handle 11 rests on an outer surface of the opening part 2. In particular, if the handle 11 is a folding handle, the handle 11 can be flush with the outer surface. From the rest position 11.1, the handle 11 can also be moved into an actuation position 11.2 for activating the electrical opening function via the electrical opening mechanism 3 and an emergency opening position 11.3 for mechanically opening the opening part 2 via the mechanical opening mechanism 4. The emergency opening position 11.3 serves to enable a user to mechanically open the opening part 2 if the electrical opening mechanism 3 malfunctions. The emergency opening position 11.3 can only be reached via the actuation position 11.2. Due to the movability of the handle 11 from the rest position 11.1 to the actuation position 11.2, it can be realized that a user has access to the vehicle 1, in particular only depending on manual operation. In this case, the electrical opening mechanism 3 can advantageously comprise a microswitch, which is activated when the actuation position 11.2 is reached. If the electrical opening mechanism 3 includes, for example, a proximity sensor, it is also conceivable that the rest position 11.1 is omitted and the handle 11 can only be moved between the actuation position 11.2 and the emergency opening position 11.3.

For a comfortable force progression in the event of an emergency opening, the handle unit 10 has a rotation element 20, which is designed to rotate about an axis of rotation 20.1 when moving 101 of the handle 11 from the actuation position 11.2 into the emergency opening position 11.3 along a rotation direction 210.1. The rotation element 20 is preferably rigidly connected to the handle 11. In particular, the rotation element 20 can include a flywheel for the handle 11. However, it is also conceivable that the rotation element 20 is connected to the handle 11 by a connecting gear 15, as shown in FIG. 1. The connecting gear 15 can, for example, include a lever and/or joint arrangement. Furthermore, the handle unit 10 comprises a counterforce element 30 for exerting a counterforce 201 on the rotation element 20 when moving 101 the handle 11 from the actuation position 11.2 to the emergency opening position 11.3. The rotation element 20 and the counterforce element 30 are preferably mounted on a handle support 14 of the handle unit 10.

FIG. 4 shows method steps of a method 100 according to the invention for operating the handle unit 10 to open the opening part 2 in the event of a defect in the electrical opening function. A movement sequence of the rotation element 20 and the counterforce element 30 in the method 100 is shown in FIGS. 3*a* to 3*e*. The rotation element 20 and the counterforce element 30 form a contact pair 40, through which the counterforce 201 can be transferred from the counterforce element 30 via the rotation element 20 to the handle 11 when the rotation element 20 and the counterforce element 30 come into contact. As a result, the user experiences haptic feedback in the form of resistance when operating the handle 11. In particular, the feedback haptically indicates to the user during normal operation that the actuation position 11.2 has been reached. FIG. 3*a* shows the rotation element 20 and the counterforce element 30 when the handle 11 is in the rest position 11.1. If the handle 11 is moved, the counterforce element 30 and the rotation element 20 each move on circular path sections. For this purpose, the rotation element 20 has a pivot bearing 22 for supporting the rotation element 20 about the axis of rotation 20.1 and the counterforce element 30 has a movable bearing 31 for rotatably bearing 31 of the counterforce element 30 about a bearing axis 30.1 parallel to the axis of rotation 20.1. The pivot bearing 22 and the movable bearing 31 of the counterforce element 30 also have a bearing distance 13 from one another, through which the circular paths intersect in some areas.

FIG. 3*b* shows the rotation element 20 and the counterforce element 30 when the handle 11 is in the actuation position 11.2, in which the rotation element 20 and the counterforce element 30 are in engagement with one another. However, it is also conceivable that the position shown in FIG. 3*b* is only reached after the actuation position 11.2 when the handle 11 is moved further in the direction of the emergency opening position 11.3. In this case, the user only receives the haptic feedback after the electrical opening mechanism 3 has already been activated. For the application of the counterforce 201, the contact pair 40, here the counterforce element 30, has at least one contact area 41, which, in the actuation position 11.2 according to FIG. 3*b*, is in a resistance position 40.1, in which the counterforce 201 can be exerted by the counterforce element 30 on the rotation element 20. To apply the counterforce 201, the handle unit 10 also has a blocking element 43 for blocking the counterforce element 30 in an actuation direction 210. The counterforce element 30 rests on the blocking element 43 when moving 101 the handle 11 from the actuation position 11.2 to the emergency opening position 11.3, whereby the counterforce element 30 is supported.

Furthermore, the contact pair 40, here the rotation element 20, has a rigid counter-contact area 42 for contacting the contact area 41 in the resistance layer 40.1. The counter-contact area 42 includes a control cam of a control contour 42.1 for an increase in the counterforce 201 when moving 101 the handle 11 from the actuation position 11.2 into the emergency opening position 11.3. A first force curve 202 when moving 101 the handle 11 from the operating position 11.2 to the emergency opening position 11.3 is shown in a diagram in FIG. 5, in which an adjustment angle 200.1 of the handle 11 is plotted against a force 200.2. The counterforce 201 forms a force peak in the first force curve 202 for haptic feedback when the control cam hits the contact area 41 according to FIG. 3*b*.

So that the counterforce element 30 can be overcome with the counterforce 201 by the rotation element 20 when moving 101 the handle 11 from the actuation position 11.2 into the emergency opening position 11.3, the contact area 41 can also be brought into a release position 40.2, which is shown in FIG. 3*c*. For this purpose, the contact area 41 is designed to be elastically deformable. As a result, the contact area 41 is at least partially depressed when moving 101 the handle 11 from the operating position 11.2 to the emergency opening position 11.3, in particular when the user increases his operating force against the counterforce 201. Advantageously, the contact area 41 can comprise a spring, in particular in the form of a leaf spring. In order to improve the flexibility of the contact area 41, the contact area 41 can be partially slidably mounted. In particular, the contact area 41 is attached to the counterforce element 30 at a first end 41.1 and is unattached at a second end 41.2. For example, the second end 41.2 can rest on a support surface of the counterforce element 30.

The emergency opening position 11.3 is shown in FIG. 3*d*, in which the rotation element 20 is pivoted in the rotation direction 210.1 in order to actuate the mechanical opening mechanism 4. For example, the rotation element 20 can include an actuation interface 23 for a Bowden cable of the mechanical opening mechanism 4. Due to the elastic design of the contact area 41, the contact area 41 is automatically returned to the resistance position 40.1 as soon as the contact of the contact pair 40 is removed.

As shown in FIG. 3*e*, the handle 11 is then moved back 102 from the emergency opening position 11.3 to the actuation position 11.2. The rotation element 20 is moved counter to the rotation direction 210.1 from the emergency opening position 11.3 in the direction of the actuation position 11.2 and/or the rest position 11.1. As a result, in a first movement section 221, the control cam again hits the contact area 41, which is located in the resistance position 40.1. Due to the movable bearing 31 of the counterforce element 30, the counterforce element 30 is lifted off the blocking element 43 and moved in at least one restoring direction 211 opposite the actuation direction 210. In particular, the counterforce element 30 is rotated in the restoring direction 211 about the bearing axis 30.1. Because the counterforce element 30 and the rotation element 20 are moved further on the respective circular path sections, the contact separates from one another in a second movement section 222. The circular paths are defined in particular by a bearing distance 13 of the pivot bearing 22 of the rotation element 20 and the movable bearing 31 of the counterforce element 30.

The counterforce element 30 is preferably biased by a biasing unit 44 in the actuation direction 210 in the direction of the blocking element 43, whereby the counterforce element 30 automatically returns to the starting position after the counterforce element 30 is released from the rotation element 20 when the handle 11 is moved back 102. For an automatic reset of the handle 11 and/or the rotation element 20, a restoring unit 12 can be provided for biasing the handle 11 into the rest position 11.1 and/or the actuation position 11.2.

Due to the movable bearing 31, the counterforce element 30 thus only exerts a reduced counterforce 201 on the rotating element 20 when the handle 11 is moved back 102 from the emergency opening position 11.3 into the actuation position 11.2 and/or the rest position 11.1, as can be seen from a second force curve 203 shown in FIG. 5 when moving back 102 the handle 11. As a result, for example, the restoring unit 12 of the handle 11 can be smaller in size, which in particular also improves the feel when moving 101 the handle 11 from the actuation position 11.2 to the emergency opening position 11.3, since the actuating force counteracts a lower restoring force. In particular, a loss of comfort in the event of a defect in the electrical opening mechanism 3 is reduced.

The above explanation of the embodiments describes the present invention solely in terms of examples. Of course, individual features of the embodiments can, if technically sensible, be freely combined with one another without departing from the scope of the present invention.

LIST OF REFERENCE NUMERALS

1 Vehicle
2 Opening part
3 Opening mechanism
4 Opening mechanism
5 Locking unit
10 Handle unit
11 Handle
11.1 Rest position
11.2 Actuation position
11.3 Emergency opening position
12 Restoring unit
13 Bearing distance
14 Handle supports
15 Connecting gears
20 Rotation element
20.1 Rotary axis or pivoting track
22 Pivot bearings or pivot support
23 Actuation interface
30 Counterforce element
30.1 Bearing axis
31 Bearing
40 Contact pair
40.1 Resistance position
40.2 Release position
41 Contact area
41.1 First end
41.2 Second end
42 Counter-contact area
421 Control contour
43 Blocking element
44 Bias unit
100 Method
101 Moving
102 Moving back
200.1 Adjustment angle
200.2 Force curve
201 Counterforce
202 First force curve
203 Second force curve
210 Actuation direction
210.1 Rotation direction
211 Restoring direction
221 First movement section
222 Second movement section

The invention claimed is:

1. A handle unit for a vehicle, comprising
a handle for opening an opening part of the vehicle, which is movable at least between an actuation position for activating an electrical opening function for opening the opening part and an emergency opening position for mechanically opening the opening part;
a rotation element, which is designed to rotate about a preferable rotation axis or pivoting track when moving the handle from the actuation position into the emergency opening position; and
a counterforce element for exerting a counterforce on the rotation element when moving the handle from the operating position to the emergency opening position;
wherein the rotation element and the counterforce element form a contact pair which has at least one contact area which is divided in a resistance position, in which the counterforce is exerted from the counterforce element on the rotation element, and a release position in which the counterforce element is overcome when moving the handle from the actuation position into the emergency opening position;
wherein the counterforce element has a movable bearing for a movement of the counterforce element in at least one restoring direction, whereby the counterforce element is overcome by the rotation element when the handle is moved back from the emergency opening position while the contact area is in the resistance position.

2. The handle unit according to claim 1, wherein a pivot bearing of the rotation element and the bearing of the counterforce element have a bearing distance from one another, through which the counterforce element and the rotation element contact each other in a first movement section when moving the handle back from the emergency opening position and are separated from each other in a second movement section.

3. The handle unit according to claim 1, wherein the contact area is designed to be deformable, so that the counterforce element is overcome by the rotation element when moving the handle from the actuation position to the emergency opening position by deforming the contact area.

4. The handle unit according to claim 1, wherein the contact area is designed to be elastic for the automatic return movement of the contact area from the release position into the resistance position.

5. The handle unit according to claim 1, wherein the contact area comprises a spring, in the form of a leaf spring.

6. The handle unit according to claim 1, wherein the contact area has a first end, at which the contact area is attached to the rotation element and/or to the counterforce element, and a second end, which is unfastened for overcoming the contact area when moving the handle from the operating position to the emergency opening position.

7. The handle unit according to claim 1, wherein the contact pair has a, rigid, counter-contact area for contacting the contact area in the resistance position, wherein the counter-contact area comprises a control contour for changing a force curve of the counterforce when moving the handle from the operating position to the emergency opening position.

8. The handle unit according to claim 1, wherein the counter-contact area and/or the contact area comprises a control cam for an increase in the counterforce when moving the handle from the actuation position to the emergency opening position.

9. The handle unit according to claim 1, wherein the movable bearing of the counterforce element is designed to rotatably mount the counterforce element about a bearing axis parallel to the axis of rotation.

10. The handle unit according to claim 1, further comprising a blocking element, which is designed to block the counterforce element in an actuation direction opposite the restoring direction, wherein the counterforce element is designed to rest on the blocking element when moving the handle from the operating position to the emergency opening position.

11. The handle unit according to claim 1, further comprising a biasing unit for biasing the counterforce element in the actuation direction.

12. The handle unit according to claim 1, wherein the handle is brought into an unactuated rest position, wherein the handle is able to be brought from the rest position via the actuation position into the emergency opening position.

13. The handle unit according to claim 1, further comprising a restoring unit for biasing the handle into the rest position and/or the actuation position.

14. An opening part, comprising an electrical opening mechanism for an electrical opening function of the opening part;

a mechanical opening mechanism for mechanically opening the opening part; and a handle unit for a vehicle, comprising a handle for opening an opening part of the vehicle, which is movable at least between an actuation position for activating an electrical opening function for opening the opening part and an emergency opening position for mechanically opening the opening part, a rotation element, which is designed to rotate about a preferable rotation axis or pivoting track when moving the handle from the actuation position into the emergency opening position; and, a counterforce element for exerting a counterforce on the rotation element when moving the handle from the operating position to the emergency opening position; wherein the rotation element and the counterforce element form a contact pair which has at least one contact area which is divided in a resistance position, in which the counterforce is exerted from the counterforce element on the rotation element, and a release position in which the counterforce element is overcome when moving the handle from the actuation position into the emergency opening position; wherein the counterforce element has a movable bearing for a movement of the counterforce element in at least one restoring direction, whereby the counterforce element is overcome by the rotation element when the handle is moved back from the emergency opening position while the contact area is in the resistance position.

15. A method for operating a handle unit, for opening an opening part of a vehicle in the event of a defect in an electrical opening function, the method comprising:

moving a handle of the handle unit from an actuation position for activating the electrical opening function into an emergency opening position for mechanically opening the opening part, wherein, when moving the handle from the actuation position to the emergency opening position, a counterforce is overcome by bringing a contact area from a resistance position, in which a counterforce is exerted by a counterforce element of the handle unit on a rotational element of the handle unit, into a release position; and moving back the handle from the emergency opening position, wherein the counterforce element is moved in at least one restoring direction, so that the rotation element overcomes the counterforce element while the contact area is in the resistance position.

* * * * *